United States Patent
Dotan et al.

(10) Patent No.: US 9,407,441 B1
(45) Date of Patent: Aug. 2, 2016

(54) ADDING ENTROPY TO KEY GENERATION ON A MOBILE DEVICE

(71) Applicant: EMC Corporation, Hopkinton, MA (US)

(72) Inventors: Yedidya Dotan, Newton, MA (US);
Lawrence N. Friedman, Arlington, MA (US); Daniel V. Bailey, Pepperell, MA (US); John Brainard, Sudbury, MA (US); William M. Duane, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 221 days.

(21) Appl. No.: 13/927,386

(22) Filed: Jun. 26, 2013

(51) Int. Cl.
*G06F 21/00* (2013.01)
*H04L 9/32* (2006.01)

(52) U.S. Cl.
CPC .................................. *H04L 9/3226* (2013.01)

(58) Field of Classification Search
CPC ......... G06F 21/31; G06F 21/36; G06F 21/30; G06F 3/0233; G06F 3/04883; G06F 21/316
See application file for complete search history.

(56) References Cited

U.S. PATENT DOCUMENTS

| | | | | |
|---|---|---|---|---|
| 6,421,453 B1* | 7/2002 | Kanevsky | ............. | G06F 21/316 340/5.2 |
| 7,434,070 B2* | 10/2008 | Moitrel | ................ | G06Q 20/105 713/159 |
| 7,644,433 B2* | 1/2010 | Mizrah | .................... | G06F 21/31 340/5.8 |
| 2005/0138392 A1 | 6/2005 | Johnson et al. | | |
| 2006/0015727 A1 | 1/2006 | Birk et al. | | |
| 2007/0030963 A1 | 2/2007 | Wyld et al. | | |
| 2007/0220273 A1* | 9/2007 | Campisi | ............. | G06K 9/00006 713/186 |
| 2007/0283416 A1* | 12/2007 | Renaud | ............................. | 726/2 |
| 2008/0091453 A1 | 4/2008 | Meehan et al. | | |
| 2010/0186074 A1* | 7/2010 | Stavrou | .................... | G06F 21/36 726/7 |
| 2013/0239191 A1 | 9/2013 | Bostick | | |
| 2014/0075547 A1* | 3/2014 | Kumai | ..................... | G06F 21/36 726/18 |
| 2014/0201536 A1* | 7/2014 | Fiske | .................... | H04L 9/0844 713/183 |

OTHER PUBLICATIONS

U.S. Appl. No. 14/036,498, filed Sep. 25, 2013, entitled: Increasing Entropy for Password and Key Generation on a Mobile Device.

* cited by examiner

*Primary Examiner* — Mohammed Waliullah
(74) *Attorney, Agent, or Firm* — Ryan, Mason & Lewis, LLP (57) ABSTRACT

Methods, apparatus and articles of manufacture for adding entropy to key generation on a mobile device are provided herein. A method includes generating a prompt via a computing device interface in connection with an authentication request to access a protected resource associated with the computing device; processing input cryptographic information entered via the computing device interface in response to the prompt against a pre-determined set of cryptographic information, wherein said pre-determined set of cryptographic information comprises one or more input elements and one or more interface manipulation measures associated with the one or more input elements; and resolving the authentication request based on said processing.

24 Claims, 6 Drawing Sheets

ADDING ENTROPY TO KEY GENERATION ON A MOBILE DEVICE

FIELD

The field relates generally to cryptography, and more particularly to mobile device security.

BACKGROUND

In the mobile domain, challenges exist with respect to the generation of keys and protecting secrets or sensitive assets. Existing approaches include the following procedures for attempting to protect a secret on a mobile device: implementing a hardware security module, incorporating stable system values, and/or utilizing a passphrase and/or passcode authentication.

Additionally, in existing approaches, mobile devices include neither hardware root of trust nor a prevalent hardware-based method of protecting a key. Further, stable system values such as an international mobile subscriber identity (IMSI) are isolated from a developer. Accordingly, mobile device and/or application management tools (mobile device management (MDM) and mobile application management (MAM), respectively) generally use passphrases to protect secrets and/or sensitive assets. However, passphrases and personal identification numbers (PINs) used in connection with mobile devices commonly have low amounts of entropy, making such security features vulnerable to attack.

Consequently, a need exists to add entropy to a PIN- or passcode-based authentication system.

SUMMARY

One or more illustrative embodiments of the present invention provide techniques for adding entropy to key generation on a mobile device.

In accordance with an aspect of the invention, a method is provided comprising the steps of: generating a prompt via a computing device interface in connection with an authentication request to access a protected resource associated with the computing device; processing input cryptographic information entered via the computing device interface in response to the prompt against a pre-determined set of cryptographic information, wherein said pre-determined set of cryptographic information comprises one or more input elements and one or more interface manipulation measures associated with the one or more input elements; and resolving the authentication request based on said processing.

Also, another aspect of the invention can additionally include the steps of learning a pattern associated with manipulation of the computing device interface in connection with the one or more interface manipulation measures over multiple iterations of said processing step to establish one or more updated interface manipulation measures associated with the one or more input elements, and updating the pre-determined set of cryptographic information based on the one or more updated interface manipulation measures.

The cryptographic techniques of the illustrative embodiments overcome one or more of the problems associated with the conventional techniques described previously, and provide mobile device security. These and other features and advantages of the present invention will become more readily apparent from the accompanying drawings and the following detailed description.

DETAILED DESCRIPTION

As will be described, the present invention, in one or more illustrative embodiments, provides techniques for adding entropy to key generation on a mobile device.

Illustrative embodiments of the present invention will be described herein with reference to exemplary communication systems and associated processing devices. It is to be appreciated, however, that the invention is not restricted to use with the particular illustrative system and device configurations shown.

Accordingly, the term "communication system," as used herein, is intended to be broadly construed so as to encompass any type of system in which multiple processing devices can communicate with one another. Also, the term "computing device," as used herein, is intended to be construed broadly so as to encompass any type of processing device that incorporates, among other things, cryptographic functionality (such as a computer, tablet, server, mobile telephone or device, smart phone, radio-frequency identification (RFID) tag or reader, authentication token, etc.). Similarly, the term "authentication server" should be understood to encompass any type of processing device or set of such devices that is operative to authenticate a passcode provided by an authentication token or other type of computing device. As used herein, an "authentication server" need not be a network-based server, and may be implemented as a portion of a device that performs other functions, as a combination of multiple servers or other devices, or in other forms.

Also, cryptographic information, as used herein, is intended to include passwords, passcodes, answers to life questions, or other authentication credentials, or values derived from such authentication credentials, or more generally any other information that a user may be required to submit in order to obtain access to an access-controlled application such as a key. As described herein, in accordance with at least one embodiment of the invention, cryptographic information includes a key stored and/or protected within data (for example, user-related data) selected from local memory on a user mobile device. By way of further example, such a cryptographic key can be used for encryption, decryption, hash-based message authentication code (HMAC) operations, and/or signature operations.

Figure 1:
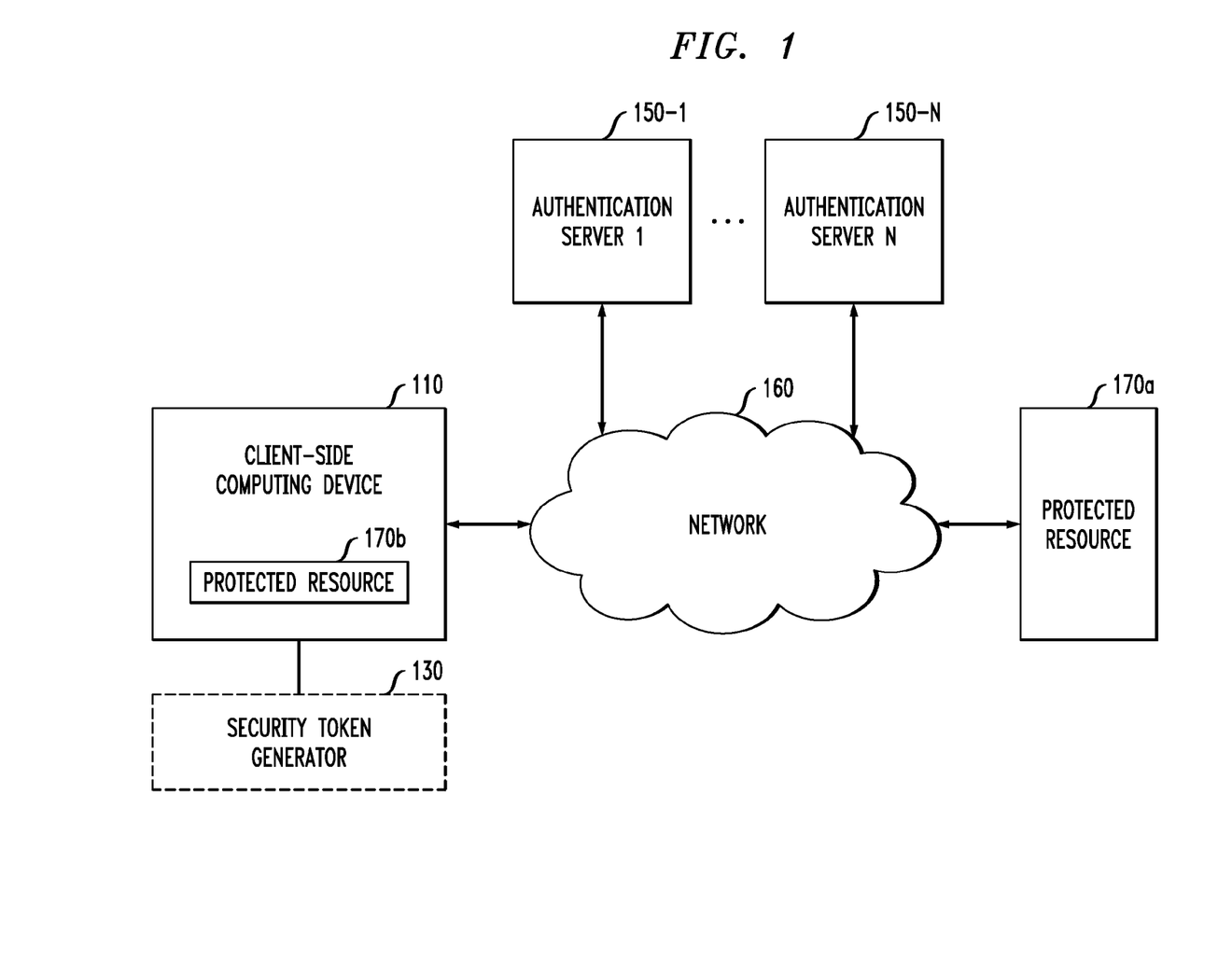
FIG. 1 is a diagram illustrating an example network environment in which one or more embodiments of the present invention can operate.

FIG. 1 illustrates an example client-side computing device (CSCD) 110 communicating with a protected resource 170a over a network 160. As detailed further below, at least one embodiment of the invention can also include a CSCD 110 that includes a protected resource 170b residing thereon. In an example implementation, a user must authenticate with one or a plurality of authentication servers 150-1 through 150-N (hereinafter, collectively referred to as authentication servers 150) using a token generated by a security token generator 130 (hereinafter, referred to as security token 130) before obtaining access to protected resource 170a and/or 170b (hereinafter, collectively referred to as protected resource 170 unless otherwise specified).

As indicated above, in at least one example embodiment of the invention described herein, a CSCD 110 can include a mobile device such as a mobile phone, a smart phone, a tablet, etc. Additionally, as depicted in FIG. 1, the network 160, may comprise, for example, a global computer network such as the Internet, a wide area network (WAN), a local area network (LAN), a satellite network, a telephone or cable network, or various portions or combinations of these and other types of networks.

According to one aspect of the invention, as noted above, the user of the CSCD 110 is authenticated using a one-time passcode generated by the security token generator 130 by authentication servers 150. The exemplary communications among the system elements 110, 130, 150 and 170 of FIG. 1 to achieve joint authentication by the authentication servers 150 is discussed further below.

It is to be appreciated that a given embodiment of the disclosed system may include multiple instances of CSCD 110, security token 130 and protected resource 170, and possibly other system components, although only single instances of such components are shown in the simplified system diagram of FIG. 1 for clarity of illustration.

The security token 130 is shown in FIG. 1 as being separate from and electrically connected to the CSCD 110. The security token 130 may be a server or other type of module that is accessible over the network 160, or it may be a software component resident on the CSCD 110. As another alternative, security token 130 may be distributed over multiple devices, one of which may be the CSCD 110. Also, for example, the security token 130 can encompass a handheld device with no connection to the other noted components, or can encompass a software application running on the CSCD 110.

Accordingly, while at least one embodiment of the present invention is illustrated herein using a security token 130 electrically connected to the CSCD 110, such that the CSCD 110 can read a given token code (or another authentication value) directly from the security token 130, other implementations are within the scope of the present invention (such as radio frequency (RF), infrared, etc.), as would be apparent to a person of ordinary skill in the art. By way of example, for security tokens 130 that are not connectable to a computer or other user device in this manner, the user may manually enter a password or another value displayed by the security token 130 at the time of the attempted access, as further detailed herein in accordance with one or more embodiments of the invention.

As noted, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of cryptographic techniques in accordance with the invention.

The CSCD 110 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other cryptographic information described as being associated with a user may, for example, be associated with a CSCD device 110, a person utilizing or otherwise associated with the device, or a combination of both the person and the device.

As also depicted in FIG. 1, the authentication servers 150 are typically associated with a third party entity, such as an authentication authority, that processes authentication requests on behalf of web servers and other resources, as well as verifies the cryptographic information that is presented by a CSCD 110.

Further, the protected resource 170 may be, for example, an access-controlled application, web site or hardware device. In other words, a protected resource 170 is a resource that grants user access responsive to an authentication process, as will be described in greater detail below. For example, protected resource 170a may include an access controlled file, e-mail, a protected application, a remote application server such as a web site or other software program or hardware device that is accessed by the CSCD 110 over a network 160.

Additionally, in at least one embodiment of the invention, protected resource 170b can include one or more applications or data residing on the CSCD 110 itself. For example, such a protected resource 170b can include access to a mobile data management container for launching applications on the CSCD 110 (such as a mobile device), which can be protected requiring a successful token-based authentication in order to run the application(s) protected by the container. Further, protected resource 170b could also include an access controlled file, e-mail, a protected application, a remote application server such as a web site or other software program or hardware device that is accessed by the CSCD 110 over a network 160. Similarly, it is possible that in order to unlock the mobile platform to perform operations, a successful authentication with the security token might be required.

As described herein, at least one embodiment of the invention includes generating and/or providing a user interface for a mobile device that presents a dial or multiple dials presenting numbers, characters and/or images to introduce additional entropy to the cryptographic process. Additionally, at least one embodiment of the invention includes facilitating ease and accuracy of use regarding a cryptographic process response entry on a mobile device. For example, implementing an aspect of directionality with respect to one or more dials can ameliorate challenges faced by users with broad or sizeable fingers and/or devices with small keyboards or input buttons.

Figure 2:
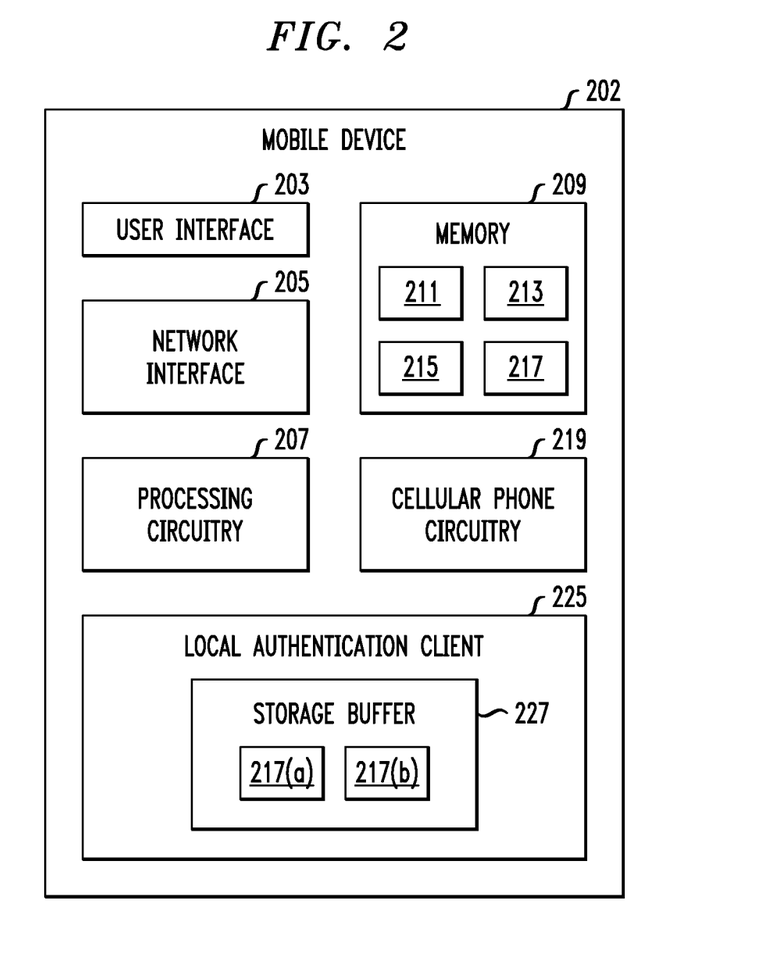
FIG. 2 is a system diagram of an exemplary mobile device on which at least one embodiment of the invention can be implemented.

FIG. 2 is a system diagram of an exemplary mobile device 202 on which at least one embodiment of the invention can be implemented. By way of illustration, FIG. 2 depicts a network interface 205 of the mobile device 202 configured to connect the mobile device 202 to a communications medium such as, for example, Wi-Fi and/or cellular telephony. Accordingly, the network interface 205 enables the mobile device 202 to communicate with the other components of an electronic environment. Additionally, the mobile device 202 includes a user interface 203 configured to receive user input and provide user output, such as a data file and/or data file location selection(s), such as described herein. One or more embodiments of the invention can include components such as a display screen, a capacitive touch display, and a push-button keyboard implemented for use in connection with the user interface 203.

Additionally, for completeness, cellular phone circuitry 219 within mobile device 202 allows the user to establish cellular phone calls with other callers having remote devices, as would be appreciated by one skilled in the art.

The memory 209 of mobile device 202 is configured to store one or more software constructs including, for example, an operating system 211, an authentication application 213, data for protected resources 215 (documents, restricted applications, etc.), a cryptographic information file 217, as well as other suitable or relevant material. Further, the processing circuitry 207 of mobile device 202 is configured to operate in accordance with the software constructs stored in the memory 209. By way of example, when the processing circuitry 207 runs the operating system 211, the processing circuitry 207 provides a secure electronic platform on which a user is able to carry out work. Such an electronic platform is capable of operating, for example, as a container to protect data and requiring user authentication before permitting access. Further, when the processing circuitry 207 runs the authentication application 213, the processing circuitry 207 communicates with the local authentication client 225 in a secure manner, for example, to obtain cryptographic information 217(a), 217(b), etc. from storage buffer 227, as additionally described herein.

It should be appreciated that the processing circuitry 207 can include one or more processors running specialized software components, such as detailed in connection with the techniques detailed herein and further depicted in FIG. 3.

In at least one embodiment of the invention, once the mobile device 202 is able to obtain valid cryptographic information, the user of the mobile device 202 is able to perform local user authentication to access protected resources. Accordingly, as noted, the mobile device 202 is provisioned with the authentication application 213 and cryptographic information file 217 holding pre-determined cryptographic information. For example, and as further detailed in connection with FIG. 3, such pre-determined cryptographic information can include one or more input elements (such as letters, numbers, characters, etc.) and one or more interface manipulation measures associated with the one or more input elements (such as directionality, velocity, etc.). As further described herein, such pre-determined cryptographic information can be learned and updated over time.

Consequently, the processing circuitry 207 of the mobile device 202 can perform a local cryptographic operation using cryptographic information 217 stored in the memory 209. In at least one embodiment of the invention the processing circuitry 207 runs the authentication application 213, which directs the user of the mobile device 202, via the user interface 203, to enter cryptographic information which is captured as one or more input elements 217(a). Additionally, the processing circuitry 207, via a software component resident thereon, calculates one or more interface manipulation measures 217(b) associated with the one or more input elements 217(a). While the captured cryptographic information 217(a) and 217(b) are temporarily stored in the storage buffer 227 of the local authentication client 225, the authentication application 213 compares the captured user-provided cryptographic information 217(a) and 217(b) with the appropriate expected items of cryptographic information from file 217.

If a match is determined via this comparison, the authentication application 213 permits the user to access a protected resource (such as, for example, data in association with element 215 that is stored in the memory 209).

Figure 3:
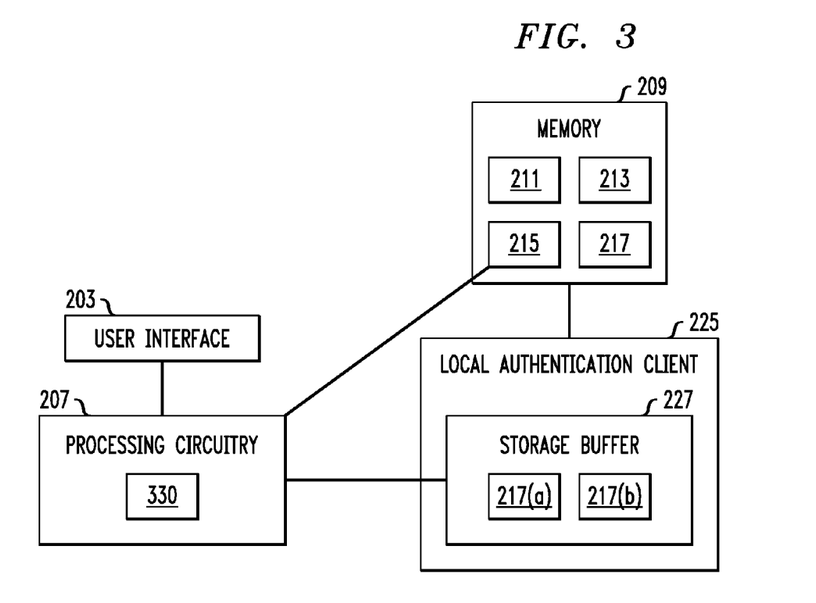
FIG. 3 is a system diagram of exemplary mobile device components, in accordance with at least one embodiment of the invention.

FIG. 3 is a system diagram of exemplary mobile device components, in accordance with at least one embodiment of the invention. As depicted in FIG. 3, a user can enter cryptographic information via user interface 203. This entered cryptographic information is captured as one or more input elements 217(a). Such elements can include, as additionally detailed herein, letters, numbers, characters, symbols, colors, images, etc. Upon being entered via the user interface 203, a manipulation measure calculation component 330 resident on the processing circuitry 207 calculates one or more interface manipulation measures 217(b) associated with the one or more entered input elements 217(a). As described further herein, the interface manipulation measures can include directionality of a manipulation of the user interface, number of iterations of an action in connection with a manipulation of the user interface, velocity of a manipulation of the user interface, etc.

Accordingly, the captured one or more input elements 217(a) and corresponding interface manipulation measures 217(b) can be stored in cryptographic information file 217 as the pre-determined cryptographic information for a given cryptographic process.

Consequently, a corresponding cryptographic flow (carried out, for example, by authentication application 213 as run by operating system 211) can take the following exemplary form. The user is prompted (via user interface 203 such as additionally depicted in FIG. 4 or FIG. 5) to enter cryptographic information in connection with an authentication request to access a protected resource associated with the mobile device (for example, the user wishes to access and/or unlock his or her smart phone). The entered cryptographic information is captured by the processing circuitry 207 as one or more input elements 217(a), and the manipulation measure calculation component 330 resident thereon calculates one or more interface manipulation measures 217(b) associated with the one or more entered input elements 217(a), and stores both 217(a) and 217(b) temporarily in the storage buffer 227 of the local authentication client 225.

Subsequently, the authentication application 213 compares the captured user-provided cryptographic information 217(a) and 217(b) with the pre-determined cryptographic information from file 217 stored in memory 209. If the user-entered input elements 217(a) match those stored in file 217, and if the one or more interface manipulation measures 217(b) associated with input elements 217(a) also match those stored in file 217, authentication is deemed successful and the user is granted access to the protected resource in question.

Figure 4:
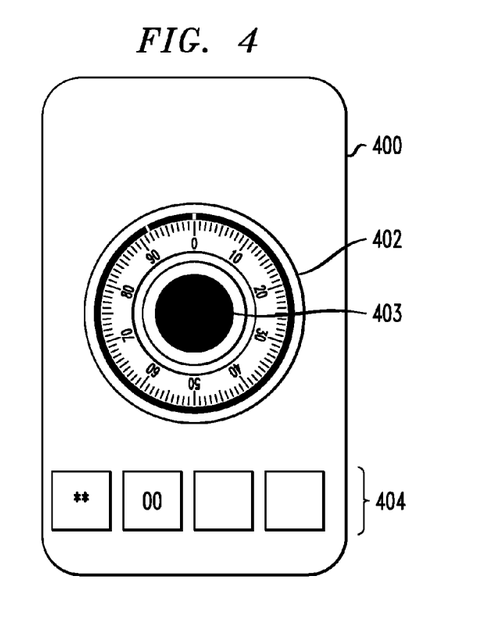
FIG. 4 is a diagram illustrating an example user interface for implementing cryptographic techniques, according to an embodiment of the invention.

FIG. 4 is a diagram illustrating an example user interface 400 for implementing cryptographic techniques, according to an embodiment of the invention. By way of illustration, FIG. 4 depicts interface 400 which includes a dial 402 presenting numbers from 0-99 and a selection button 403.

In an example scenario, a user is prompted for a PIN or passcode upon requesting authentication (for example, when the user attempts to access or unlock his or her mobile phone). Subsequently, the user enters each number in the sequence of numbers representing his or her PIN (or passcode) by manipulating the dial 402 (for instance, by swiping a finger in a circular direction over the dial on the interface in a clockwise or counter-clockwise direction) until the dial points to or otherwise indicates the desired number, at which point the user can press or tap the button 403 to enter that selected number. At that time, the entered number is briefly presented in the windows 404, shown below the dial 402 in example interface 400. Additionally, in the example interface 400 shown in FIG. 4, the windows 404 include four spaces, allowing for an 8-digit PIN.

Using a PIN or passcode entry method such as described above in connection with FIG. 4, entropy is added to the cryptographic process by incorporating directionality of turns of the dial as well as the number of turns of the dial as elements in the process. By way merely of example, and in further reference to the example interface 400 depicted in FIG. 4, a user may designate his or her PIN as "02 38 94 67," preceded by two full revolutions of the dial (that is, crossing "0" twice), and with each selected number in the PIN being reached via clockwise turns of the dial.

Further, at least one embodiment of the invention includes implementing a learning period wherein the mobile device discovers patterns regarding the velocity with which the user commonly enters his or her PIN. More generally, one or more interface manipulations (directionality of movement, velocity of movement, etc.) are detected over time (for example, over a pre-defined period of time, or continuously) to determine an identifiable value range for the one or more interface manipulations for subsequent use as a cryptographic value. Such items of data can be collected via the user interface (for example, a touch screen). Detected data points can be placed on a time-based graph to observe and/or determine a funnel-like effect. For example, it can be determined, over time, that the PIN is entered on a given mobile device in a range of 1.5 seconds to 1.8 seconds based on detecting this given interface manipulation (that is, velocity) over time. Therefore, that value range could serve a cryptographic parameter in subsequent cryptographic actions. Additionally, a range of such indicators (such as velocity of entry, as noted in the preceding example), selection of direction (for example, an American user may be likely to go left to right in a dial with letters, while an Israeli user may go right to left in a dial with letters) can be selected.

As noted above, for example, a mobile device can learn, after an appropriate training period over a number of user entries, that the PIN is commonly correctly entered within a duration range of 1.5 seconds to 1.8 seconds (possibly with additional sub-ranges covering each individual input of the PIN within that duration). Accordingly, in such an embodiment of the invention, authentication can be denied if the PIN, even if the numerical (and directional and/or number of turns) input is correct, is entered slowly or quickly enough so as to fall outside of the learned range.

Additionally, while the example interface 400 depicted in FIG. 4 illustrates a dial 402 with a numerical range from 0-99, it is to be appreciated that one or more embodiments of the invention can encompass and/or incorporate numerous alternative features and/or combinations of features. By way merely of example, the dial can include characters and/or letters in lieu of or in addition to numbers. For instance, a user can be required to initially select a PIN that includes multiple varying elements (for example, at least one capital letter, at least one lower-case letter, and at least one number). Alternatively, the dial can include images, symbols, pictures and/or colors, for example.

Further, in at least one embodiment of the invention, two or more dials can be used (for example, one smaller dial placed within a larger dial), wherein the two or more dials can include the same elements (for example, numbers, letters, characters, colors, etc.) and/or different elements from one another, and the additional interface manipulation measures of directionality, number of turns, and velocity can be separately considered for each dial, thereby incorporating additional entropy to the cryptographic process.

Also, while the example interface 400 depicted in FIG. 4 illustrates windows 404 that include four spaces, it is to be appreciated that one or more embodiments of the invention can include windows or display areas that vary in number and/or configuration.

Additionally, as noted above, an embodiment of the invention such as depicted in FIG. 4, for example, can also facilitate use and/or accuracy of user input in situations wherein, for example, the user has broad or large fingers or wherein the keyboard or keypad on the device interface is of a small size such that erroneous inputs are commonly and/or easily entered.

Figure 5:
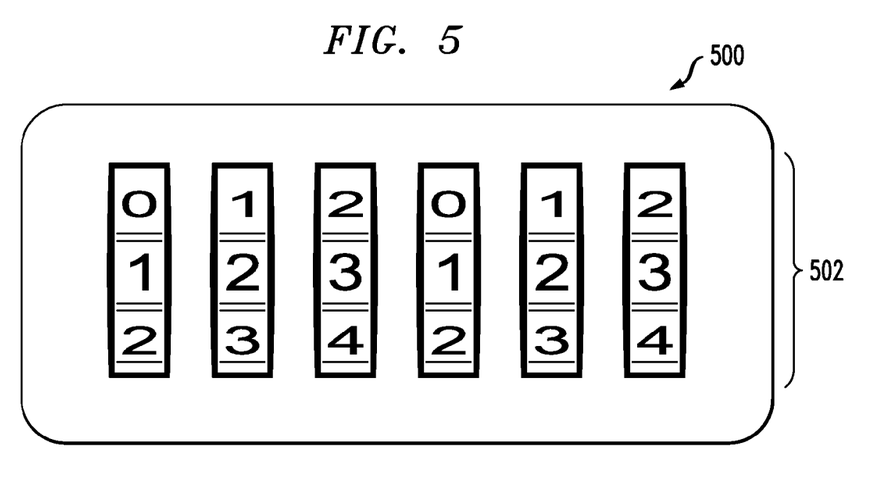
FIG. 5 is a diagram illustrating an example user interface for implementing cryptographic techniques, according to an embodiment of the invention.

FIG. 5 is a diagram illustrating an example user interface for implementing cryptographic techniques, according to an embodiment of the invention. By way of illustration, FIG. 5 depicts interface 500 which includes a set of six dials 502, each presenting numbers between 0 and 4.

Similar to the illustration depicted in FIG. 4, in an example scenario, a user is prompted for a PIN or passcode upon requesting authentication, and thereafter the user manipulates the set of dials 502 to enter each number in the sequence of numbers representing his or her PIN or passcode (for instance, by swiping a finger up or down over each dial on the interface) until the dial indicates the desired number at the targeted position on the dial (for example, along a middle horizontal plane as shown in FIG. 5).

Using a PIN or passcode entry method such as described herein, entropy can be added to the cryptographic process by incorporating directionality of manipulation of the dial (for example, an upward direction or a downward direction in the FIG. 5 interface 500). Similar to the embodiment detailed in connection with FIG. 4, entropy can also be added to the cryptographic process by incorporating the number of revolutions of one or more of the dials 502 as an element in the process. By way merely of example, and in further reference to the example interface 500 depicted in FIG. 5, a user may designate his or her PIN as "1 2 3 1 2 3," preceded by one full revolution of each dial (or, for example, crossing "0" once), and with each selected number in the PIN being reached via downward manipulation of the dials.

Further, as noted above in connection with FIG. 4, at least one embodiment of the invention includes implementing a learning period wherein the mobile device discovers patterns regarding the velocity with which the user commonly enters his or her PIN, and subsequently incorporating velocity as an additional entropy element for the cryptographic process.

Additionally, at least one embodiment of the invention can include an implementation so as to protect cryptographic information such as a key in one or more data files resident on a mobile device. Such a key can, for example, be used to encrypt or lock a mobile device management (MDM) container, thereby serving to further protect data and/or wrap applications that contain credentials. Additionally, such a key (or other piece of cryptographic information) can, for example, be used to unlock or decrypt a container of additional keys. By way of example, consider a scenario wherein a user attempts to access an application that is controlled by an MDM, such as email, that includes both online and offline data. Accordingly, in such a scenario, the user is challenged to generate a key to access his or her email.

Further, while the example interface 500 depicted in FIG. 5 illustrates a set of six dials 502 with a numerical range from 0-4, it is to be appreciated that one or more embodiments of the invention can encompass and/or incorporate numerous alternative features and/or combinations of features with respect to the dials. By way of example, the set of dials can include a number of dials differing from the six dials 502 depicted in the example interface 500, and the set of dials can encompass a numerical range different from the range of 0-4 depicted in the example interface 500. Also, the set of dials can include characters and/or letters in lieu of or in addition to numbers. For instance, as noted above, a user can be required to initially select a PIN that includes multiple varying elements (for example, at least one capital letter, at least one lower-case letter, and at least one number). Alternatively, for example, the set of dials can include images, symbols, pictures and/or colors, or a combination thereof.

At least one embodiment of the invention additionally includes hashing a combination of selected images and/or pictures to leverage the entirety of data contained therein to add further entropy to a cryptographic process. Such an embodiment includes selecting an image object and running a hash function such as MD5 (a message digest algorithm) or a secure hash algorithm (SHA) thereon, with or without salting, and subsequently trimming or carrying out a partial selection (for example, selecting the first x bytes).

Further, at least one embodiment of the invention includes re-ordering the input user PIN after entry to incorporate an additional layer of entropy. For example, a user can enter a (correct) PIN of "1 2 3 1 2 3," after which, the mobile device can map this input PIN to a unique user via a mapping table so as to identify a re-ordered version of the PIN (for example, "1 3 2 1 3 2") that is used by the device to grant authentication to the user. By way of example, the mobile device can store such a mapping table in local memory or some other storage component. Similarly, at least one embodiment of the invention includes mapping an input user PIN to a more sophisticated and/or complex passcode after entry of the PIN by the user to incorporate an additional layer of entropy (or to comply, for example, with a corporate policy in a corporate or enterprise context). For example, a user can enter a (correct) PIN of "1 2 3 1 2 3," after which, the mobile device can map this input PIN to a unique user via a mapping table so as to identify a separate version of the PIN (for example, "B 8 k 0 W R 6 N A 2P at 9 L") that is used by the device to grant authentication to the user.

Figure 6:
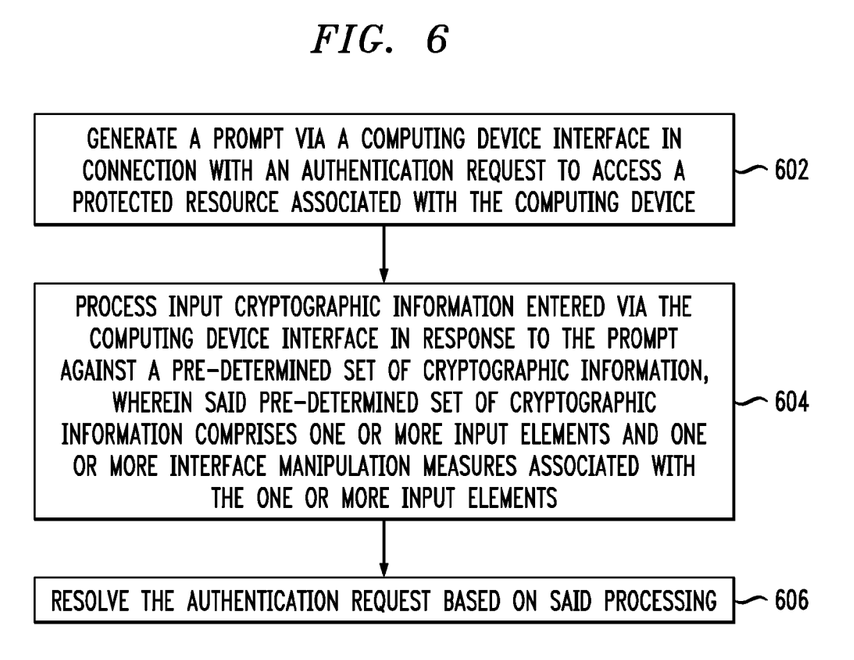
FIG. 6 is a flow diagram illustrating techniques according to an embodiment of the invention.

FIG. 6 is a flow diagram illustrating techniques according to an embodiment of the present invention. Step 602 includes generating a prompt via a computing device interface in connection with an authentication request to access a protected resource associated with the computing device (a mobile device, a smart phone, a tablet, etc.). For example, the authentication request to access the protected resource associated with the computing device can include a prompt to unlock the computing device. Additionally, as described herein, the input elements in the pre-determined set of cryptographic information can include multiple elements of varying type (for example, a capital letter, a number, a symbol, and a lower-case letter).

Step 604 includes processing input cryptographic information (for example, authentication information) entered via the computing device interface in response to the prompt against a pre-determined set of cryptographic information (for example, a set of authentication information), wherein said pre-determined set of cryptographic information comprises one or more input elements (a number, a letter, a character, a symbol, an image, a color, etc.) and one or more interface manipulation measures associated with the one or more input elements. As detailed herein, interface manipulation measures associated with the one or more input elements can include directionality of a manipulation of the computing device interface. Directionality might include, for instance, swiping of a finger via the interface in a clockwise direction, a counter-clockwise direction, an upward direction, a downward direction, a leftward direction, and/or a rightward direction.

Additionally, interface manipulation measures associated with the one or more input elements can include a distinct number of iterations of an action in connection with a manipulation of the computing device interface. This might include, for instance, a number of rotations of an element of the computing device interface. Further, interface manipulation measures associated with the one or more input elements can include velocity of a manipulation of the computing device interface.

Step 606 includes resolving the authentication request based on said processing. Resolving the authentication request includes granting access to the protected resource associated with the computing device if the input cryptographic information matches the pre-determined set of cryptographic information. Similarly, resolving the authentication request includes denying access to the protected resource associated with the computing device if the input cryptographic information does not match the pre-determined set of cryptographic information.

The techniques depicted in FIG. 6 can also include discovering a pattern associated with an action pertaining to manipulation of the computing device interface to determine one of the one or more interface manipulation measures associated with the one or more input elements. Further, at least one embodiment of the invention includes hashing a combination of the one or more input elements to utilize data contained therein to introduce additional entropy to said authentication request.

Additionally, the techniques depicted in FIG. 6 can include re-ordering the one or more input elements after entry, wherein said re-ordering includes mapping the one or more input elements to a unique user via a mapping table so as to identify a re-ordered version of the one or more input elements for granting access to the protected resource associated with the computing device. Also, such techniques as depicted in FIG. 6 can include converting the one or more input elements to a second version of the one or more input elements for granting access to the protected resource associated with the computing device, wherein said re-ordering includes mapping the one or more input elements to a unique user via a mapping table, and wherein the second version of the one or more input introduces at least one additional aspect of complexity.

Figure 7:
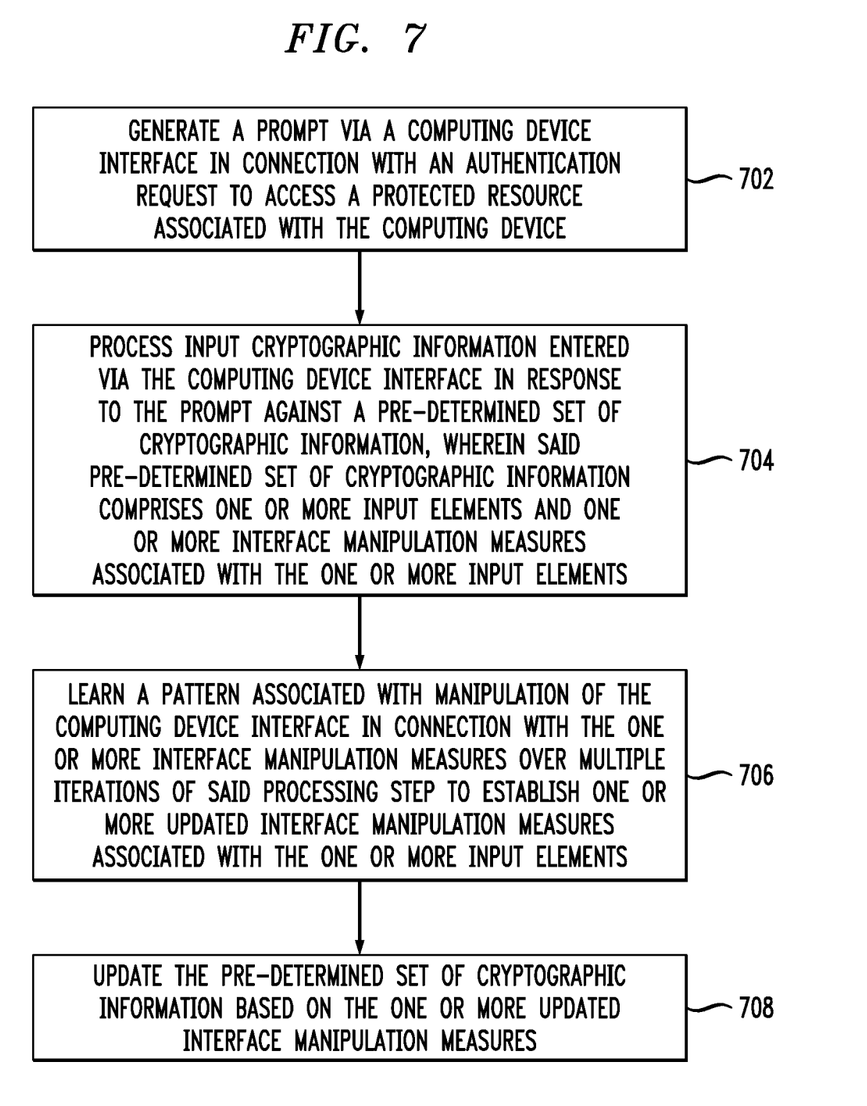
FIG. 7 is a flow diagram illustrating techniques according to an embodiment of the invention.

FIG. 7 is a flow diagram illustrating techniques according to an embodiment of the invention. Step 702 includes generating a prompt via a computing device interface in connection with an authentication request to access a protected resource associated with the computing device.

Step 704 includes processing input cryptographic information (for example, authentication information) entered via the computing device interface in response to the prompt against a pre-determined set of cryptographic information (for example, a set of authentication information), wherein said pre-determined set of cryptographic information comprises one or more input elements and one or more interface manipulation measures associated with the one or more input elements. As noted herein, the interface manipulation measures can include at least one of directionality of a manipulation of the computing device interface, number of iterations of an action in connection with a manipulation of the computing device interface, and velocity of a manipulation of the computing device interface.

Step 706 includes learning a pattern associated with the manipulation of the computing device interface in connection with the one or more interface manipulation measures over multiple iterations of said processing step to establish one or more updated interface manipulation measures associated with the one or more input elements. Step 708 includes updating the pre-determined set of cryptographic information based on the one or more updated interface manipulation measures.

Cryptographic techniques of the type described herein may be implemented in a wide variety of different applications. An additional exemplary communication system application that may incorporate such techniques will now be described with reference to FIG. 8, which includes a communication system 800 comprising a plurality of mobile telephones 802-1 and 802-2 and computers 804-1, 804-2 and 804-3, configured to communicate with one another over a network 806.

Figure 8:
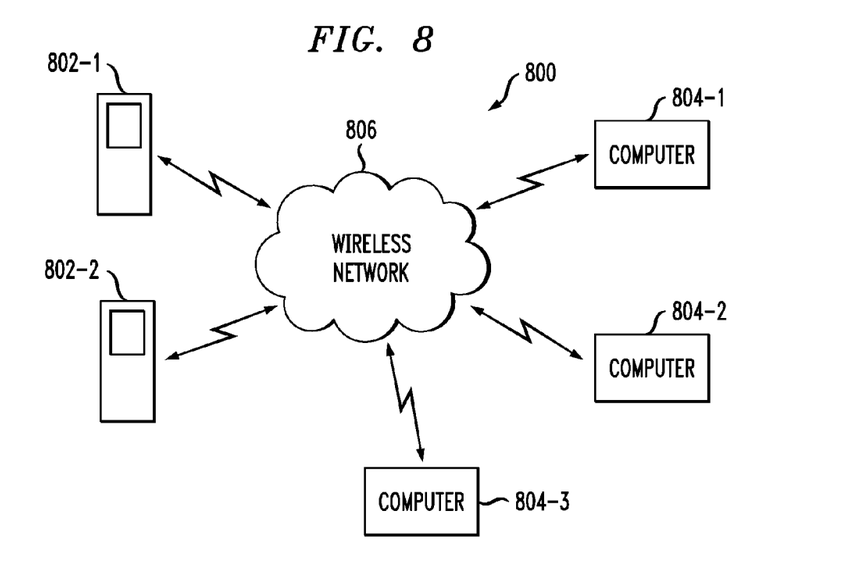
FIG. 8 shows an example embodiment of a communication system that may incorporate functionality of the type illustrated in at least one embodiment of the invention.

Any two or more of the devices 802 and 804 may correspond to computing devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 9:
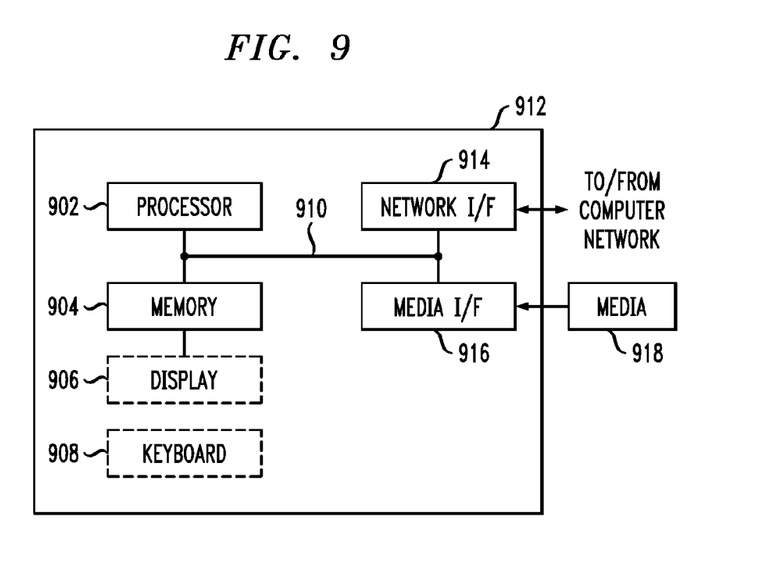
FIG. 9 is a system diagram of an exemplary computer system and/or client-side computing device on which at least one embodiment of the invention can be implemented.

By way of example, an aspect of the present invention can make use of software running on a general purpose computer. For instance, FIG. 9 is a system diagram of an exemplary computer system on which at least one embodiment of the invention can be implemented. As depicted in FIG. 9, an example implementation employs, for example, a processor 902, a memory 904, and an input/output interface formed, for example, by a display 906 and a keyboard 908. The term "processor" as used herein includes any processing device(s), such as, for example, one that includes a central processing unit (CPU) and/or other forms of processing circuitry. Additionally, the processor 902 as shown may be viewed as representing, for example, CSCD 110, security token generator 130, authentication servers 150 and protected resource 170. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 902, memory 904, and input/output interface such as display 906 and keyboard 908 can be interconnected, for example, via bus 910 as part of a data processing unit 912. Suitable interconnections via bus 910, can also be provided to a network interface 914 (such as a network card), which can be provided to interface with a computer network, and to a media interface 916 (such as a diskette or compact disc read-only memory (CD-ROM) drive), which can be provided to interface with media 918.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 908, displays 906, and pointing devices, can be coupled to the system either directly (such as via bus 910) or through intervening I/O controllers.

Network adapters such as network interface 914 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 912 as depicted in FIG. 9) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), Flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from additional entropy in key generation. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:

generating a prompt via a computing device interface in connection with an authentication request to access a protected resource associated with the computing device;

processing input cryptographic information entered via the computing device interface in response to the prompt against a pre-determined set of cryptographic information, wherein said pre-determined set of cryptographic information comprises (i) two or more input elements and (ii) two or more qualitative and/or quantitative interface manipulation measures associated with the action of entering the two or more input elements via the computing device interface, wherein the two or more qualitative and/or quantitative interface manipulation measures comprise at least (a) pace of input and (b) directionality of the manipulation of the computing device interface, and wherein said processing comprises:
re-ordering the two or more input elements after being entered via the computing device interface by mapping the two or more input elements to a unique user via a mapping table stored locally on the computing device so as to identify a re-ordered version of the two or more input elements to be used in combination with the two or more qualitative and/or quantitative interface manipulation measures for granting access to the protected resource associated with the computing device; and
resolving the authentication request based on said processing, wherein said resolving comprises granting access to the protected resource upon a determination that the input cryptographic information matches (i) the two or more input elements of the pre-determined set of cryptographic information and (ii) the two or more qualitative and/or quantitative interface manipulation measures of the pre-determined set of cryptographic information.

2. The method of claim 1, wherein said input cryptographic information comprises one or more items of authentication information.

3. The method of claim 1, wherein said pre-determined set of cryptographic information comprises a set of authentication information.

4. The method of claim 1, wherein said computing device comprises a mobile device.

5. The method of claim 1, wherein said two or more input elements comprises at least one of a number, a letter, a character, a symbol, an image, and a color.

6. The method of claim 1, wherein said directionality of a manipulation of the computing device interface comprises swiping of a finger via the interface in at least one of a clockwise direction, a counter-clockwise direction, an upward direction, a downward direction, a leftward direction, and a rightward direction.

7. The method of claim 1, wherein said two or more qualitative and/or quantitative interface manipulation measures associated with the action of entering the two or more input elements via the computing device interface further comprises a distinct number of iterations of an action in connection with a manipulation of the computing device interface.

8. The method of claim 7, wherein said a distinct number of iterations of an action comprises a number of rotations of an element of the computing device interface.

9. The method of claim 1, wherein said two or more qualitative and/or quantitative interface manipulation measures associated with the action of entering the two or more input elements via the computing device interface further comprises velocity of a manipulation of the computing device interface.

10. The method of claim 1, wherein said resolving further comprises denying access to the protected resource associated with the computing device upon a determination that the input cryptographic information does not match (i) the two or more input elements of the pre-determined set of cryptographic information and (ii) the two or more qualitative and/or quantitative interface manipulation measures of the pre-determined set of cryptographic information.

11. The method of claim 1, comprising:
hashing a combination of the two or more input elements to utilize data contained therein to introduce additional entropy to said authentication request.

12. The method of claim 1, comprising:
converting the two or more input elements to a second version of the two or more input elements for granting access to the protected resource associated with the computing device, wherein said converting comprises mapping the two or more input elements to a unique user via a mapping table, and wherein the second version of the two or more input elements introduces at least one additional aspect of complexity.

13. The method of claim 1, wherein said two or more input elements in said pre-determined set of cryptographic information comprises multiple elements of varying type.

14. An article of manufacture comprising a non-transitory processor-readable storage medium having processor-readable instructions tangibly embodied thereon which, when implemented, cause a processor to:
generate a prompt via a computing device interface in connection with an authentication request to access a protected resource associated with the computing device;
process input cryptographic information entered via the computing device interface in response to the prompt against a pre-determined set of cryptographic information, wherein said pre-determined set of cryptographic information comprises (i) two or more input elements and (ii) two or more qualitative and/or quantitative interface manipulation measures associated with the
action of entering the two or more input elements via the computing device interface, wherein the two or more qualitative and/or quantitative interface manipulation measures comprise at least (a) pace of input and (b) directionality of the manipulation of the computing device interface, and wherein said processing comprises:
re-ordering the two or more input elements after being entered via the computing device interface by mapping the two or more input elements to a unique user via a mapping table stored locally on the computing device so as to identify a re-ordered version of the two or more input elements to be used in combination with the two or more qualitative and/or quantitative interface manipulation measures for granting access to the protected resource associated with the computing device; and
resolve the authentication request based on said processing, wherein said resolving comprises granting access to the protected resource upon a determination that the input cryptographic information matches (i) the two or more input elements of the pre-determined set of cryptographic information and (ii) the two or more qualitative and/or quantitative interface manipulation measures of the pre-determined set of cryptographic information.

15. An apparatus comprising:
a memory; and
at least one processor coupled to the memory and configured to:
generate a prompt via a computing device interface in connection with an authentication request to access a protected resource associated with the computing device;
process input cryptographic information entered via the computing device interface in response to the prompt against a pre-determined set of cryptographic information, wherein said pre-determined set of cryptographic information comprises (i) two or more input elements and (ii) two or more qualitative and/or quantitative interface manipulation measures associated with the action of entering the two or more input elements via the computing device interface, wherein the two or more qualitative and/or quantitative interface manipulation measures comprise at least (a) pace of input and (b) directionality of the manipulation of the computing device interface, and wherein said processing comprises:

re-ordering the two or more input elements after being entered via the computing device interface by mapping the two or more input elements to a unique user via a mapping table stored locally on the computing device so as to identify a re-ordered version of the two or more input elements to be used in combination with the two or more qualitative and/or quantitative interface manipulation measures for granting access to the protected resource associated with the computing device; and resolve the authentication request based on said processing, wherein said resolving comprises granting access to the protected resource upon a determination that the input cryptographic information matches (i) the two or more input elements of the pre-determined set of cryptographic information and (ii) the two or more qualitative and/or quantitative interface manipulation measures of the pre-determined set of cryptographic information.

16. A method comprising:

generating a prompt via a computing device interface in connection with an authentication request to access a protected resource associated with the computing device;

processing input cryptographic information entered via the computing device interface in response to the prompt against a pre-determined set of cryptographic information, wherein said pre-determined set of cryptographic information comprises (i) two or more input elements and (ii) two or more qualitative and/or quantitative interface manipulation measures associated with the action of entering the two or more input elements via the computing device interface, wherein the two or more qualitative and/or quantitative interface manipulation measures comprise at least (a) pace of input and (b) directionality of the manipulation of the computing device interface, and wherein said processing comprises:

re-ordering the two or more input elements after being entered via the computing device interface by mapping the two or more input elements to a unique user via a mapping table stored locally on the computing device so as to identify a re-ordered version of the two or more input elements to be used in combination with the two or more qualitative and/or quantitative interface manipulation measures for granting access to the protected resource associated with the computing device;

learning a pattern associated with manipulation of the computing device interface in connection with the two or more qualitative and/or quantitative interface manipulation measures over multiple iterations of said processing step to establish two or more updated qualitative and/or quantitative interface manipulation measures associated with the action of entering the two or more input elements via the computing device interface; and updating the pre-determined set of cryptographic information based on the two or more updated interface manipulation measures.

17. The method of claim 16, wherein said input cryptographic information comprises one or more items of authentication information.

18. The method of claim 16, wherein said pre-determined set of cryptographic information comprises a set of authentication information.

19. The method of claim 16, wherein said two or more qualitative and/or quantitative interface manipulation measures associated with the action of entering the two or more input elements via the computing device interface further comprises a distinct number of iterations of an action in connection with a manipulation of the computing device interface.

20. The method of claim 16, wherein said two or more qualitative and/or quantitative interface manipulation measures associated with the action of entering the two or more input elements via the computing device interface further comprises velocity of a manipulation of the computing device interface.

21. The method of claim 16, comprising:

hashing a combination of the two or more input elements to utilize data contained therein to introduce additional entropy to said authentication request.

22. The method of claim 16, wherein said two or more input elements comprises at least one of a number, a letter, a character, a symbol, an image, and a color.

23. The method of claim 16, wherein said directionality of a manipulation of the computing device interface comprises swiping of a finger via the interface in at least one of a clockwise direction, a counter-clockwise direction, an upward direction, a downward direction, a leftward direction, and a rightward direction.

24. The method of claim 16, wherein said computing device comprises a mobile device.

* * * * *